United States Patent [19]
Latza

[11] Patent Number: 5,131,427
[45] Date of Patent: Jul. 21, 1992

[54] PILOT OPERATED RELIEF VALVE

[75] Inventor: Steven T. Latza, Memphis, Tenn.

[73] Assignee: Flint Hydraulic, Inc., Memphis, Tenn.

[21] Appl. No.: 740,906

[22] Filed: Aug. 6, 1991

[51] Int. Cl.$^5$ .............................................. G05D 16/04
[52] U.S. Cl. ................................ 137/489; 137/492.5; 137/495
[58] Field of Search ................ 137/489, 488, 495, 492, 137/269, 492.5

[56] References Cited

U.S. PATENT DOCUMENTS

| | | |
|---|---|---|
| 2,664,916 | 1/1954 | Conley . |
| 3,083,726 | 4/1963 | Woelfel .......................... 137/488 X |
| 3,097,665 | 7/1963 | Gauldie . |
| 3,180,355 | 4/1965 | Long .............................. 137/495 X |
| 3,270,776 | 9/1966 | Carls . |
| 3,613,717 | 10/1971 | Smith . |
| 4,535,966 | 8/1985 | Post et al. . |

Primary Examiner—Alan Cohan
Attorney, Agent, or Firm—Heiskell, Donelson, Bearman, Adams, Williams & Kirsch

[57] ABSTRACT

A pilot operated, balanced piston relief valve is provided with a body having a flow passageway therethrough and a main valve disposed therein, a pilot valve secured to the body and responsive to the pressure of fluid within the flow passage through the body, and a selective valve disposed between the body and the pilot valve for selectively discharging fluid from the body through a vent without requiring actuation of the pilot valve. In a preferred embodiment, the selective valve comprises an electrically actuatable cartridge valve secured within a manifold, with passageways formed through the manifold for providing fluid communication between the pilot valve, the main valve, and the vent.

24 Claims, 5 Drawing Sheets

PILOT OPERATED RELIEF VALVE

BACKGROUND OF THE INVENTION

1. Field

This invention relates to hydraulic relief valves and, more particularly, to pilot operated, balanced piston compound relief valves having replaceable modular venting valves for varying the characteristics of the relief valves.

2. Description of the Prior Art

Pilot operated, balanced piston compound relief valves are well known in the art for use in a variety of operations relating to hydraulic circuits. Such valves typically operate in two stages, the first stage comprising the opening of a pilot valve, and the second stage comprising the opening of a main valve which includes a balanced piston. Typically, the pilot valve is disposed in an upper portion of the relief valve, while the balanced piston is disposed in the main valve body which also includes the high flow port connections. The release pressure for the pilot in conventional relief valves can be pre-selected, and is preferably adjustable by the user.

The balanced piston includes a central bore formed therethrough, providing for fluid communication between the low pressure side of the pilot valve and a vent leading to the fluid reservoir (tank). The balanced piston also includes a shoulder portion having a longitudinally offset orifice for providing fluid communication between the high flow port connections of the main valve body and the high pressure side of the pilot valve. When the pressure within the main valve body exceeds the pilot valve setting, the pilot valve opens, venting fluid through the central bore of the piston to the tank. The release of pressure above the piston causes the higher pressure within the main valve body to force the piston upward against a light (20 PSI, for example) spring, thereby unseating the piston and allowing the high pressure fluid to vent directly from the main valve body to the tank.

It has been found advantageous to provide conventional relief valves with remote actuation means for effecting the venting of fluid through the main valve body in response to an input other than an increase in pressure sufficient to unseat the pilot valve. For example, it has been found desirable to modify the pilot valve housing to accept an electrically actuated solenoid valve, so that fluid can be vented through the central piston bore as described above in response to an electrical signal. In order to equip a conventional valve with such remote actuation means, however, it is necessary to substantially modify the pilot valve housing. Furthermore, different solenoids require different modification to the housing, so that a variety of solenoids may not be easily interchangeable with a single relief valve.

It has also been found desirable to incorporate a supplemental pilot valve onto the conventional pilot valve housing, the supplemental valve being either remotely actuatable or set to automatically vent at a pressure lower than that required for the primary pilot valve. A supplemental pilot valve may be added to the existing conventional pilot valve housing without making substantial modifications, but a secondary vent line must be added for venting the supplemental pilot valve to the tank.

A conventional pilot operated, balanced piston compound relief valve is shown in U.S. Pat. No. 3,613,717 entitled "Remote Electrically Modulated Relief Valve," issued Oct. 19, 1971. The '717 patent is illustrative of the above-mentioned problems, wherein the pilot valve housing requires substantial modification in order to incorporate an electrically actuated solenoid. Other conventional devices exemplifying the disadvantages present in prior art designs are shown in the catalogs of Fluid Controls, Inc., Vickers, Inc., and Nachi America.

In light of the disadvantages present in prior art apparatus as set forth above, a need has been recognized for an easily replaceable, remotely actuatable valve which can be incorporated into an existing pilot operated, balanced piston relief valve without requiring any significant modifications. A need has also been recognized for a pilot operated, balanced piston relief valve adapted to include a supplemental relief valve, ventable to the tank through the main valve body without necessitating additional vent lines.

BRIEF SUMMARY OF THE INVENTION

In order to address the deficiencies in the prior art devices as discussed above, the present invention provides a modular manifold specially configured for installation between the pilot valve housing and the main valve body in a conventional pilot operated, balanced piston relief valve. The manifold has formed therein a port for receiving a conventional cartridge valve, and internal passageways for providing fluid communication between the cartridge valve and the high and low pressure sides of the pilot valve. With the cartridge valve in its open position, fluid communication is established between the high and low sides of the pilot valve, thereby allowing fluid to vent to the tank as if the pilot valve were open, effectively overriding the pilot valve. The manifold also includes internal passageways for allowing the pilot valve to operate in its intended conventional manner when the cartridge valve is maintained in a closed position.

This invention also includes a unique spool member for providing fluid communication between the low pressure side of the relief valve and the discharge port through the central bore of the balanced piston. The spool member establishes a sealed fluid connection between the internal passageways of the manifold and the central bore of the piston, thereby allowing selective venting of fluid to the tank without necessitating any additional vent lines.

The improved relief valve incorporating the modular manifold of the present invention can be utilized for venting as with purely conventional relief valves, or remotely actuated by electrical control means operatively connected to a cartridge valve disposed in the manifold. Additionally, the operating voltage for the cartridge valve may be easily selected by changing valves or by simply changing coils within a single cartridge valve, thereby adapting the relief valve for a variety of venting functions.

The unique modular manifold of the present invention greatly expands the function of a conventional relief valve, at a minimal cost. In order to provide a wide variety of performance characteristics for the relief valve, the user thereof must only maintain a supply of relatively inexpensive cartridge valves and replacement coils, rather than the considerably more expensive modified pilot valve housings and corresponding solenoid valves. With the addition of conventional pressure sensing devices, the present invention also provides the capability for venting at a multitude of different system pressures, or venting based on the pressure at a completely different point in the system, without requiring the use of any additional fluid lines.

It is an object of the present invention to provide a pilot operated, balanced piston relief valve with a wide variety of venting functions and characteristics.

Another object of the present invention is to provide a modular manifold for use with a variety of generally conventional pilot operated, balanced piston relief valves, suitable for use with remotely actuatable valves for varying the performance characteristics of the relief valve. A further object of this invention is to provide such a modular manifold suitable for use with conventional cartridge valves.

A still further object of the present invention is to provide means for converting a generally conventional pilot operated, balanced piston relief valve to a multifunction, remotely actuatable relief value without necessitating costly modifications to the valve.

An even further object is to provide means for converting a conventional relief valve to a remotely actuatable relief valve without requiring additional vent lines to the tank.

These and other objects of the present invention will be readily apparent to those skilled in the art upon reviewing the attached drawings and detailed description set forth hereinbelow.

DETAILED DESCRIPTION OF THE PREFERRED EMBODIMENT

Figure 1:
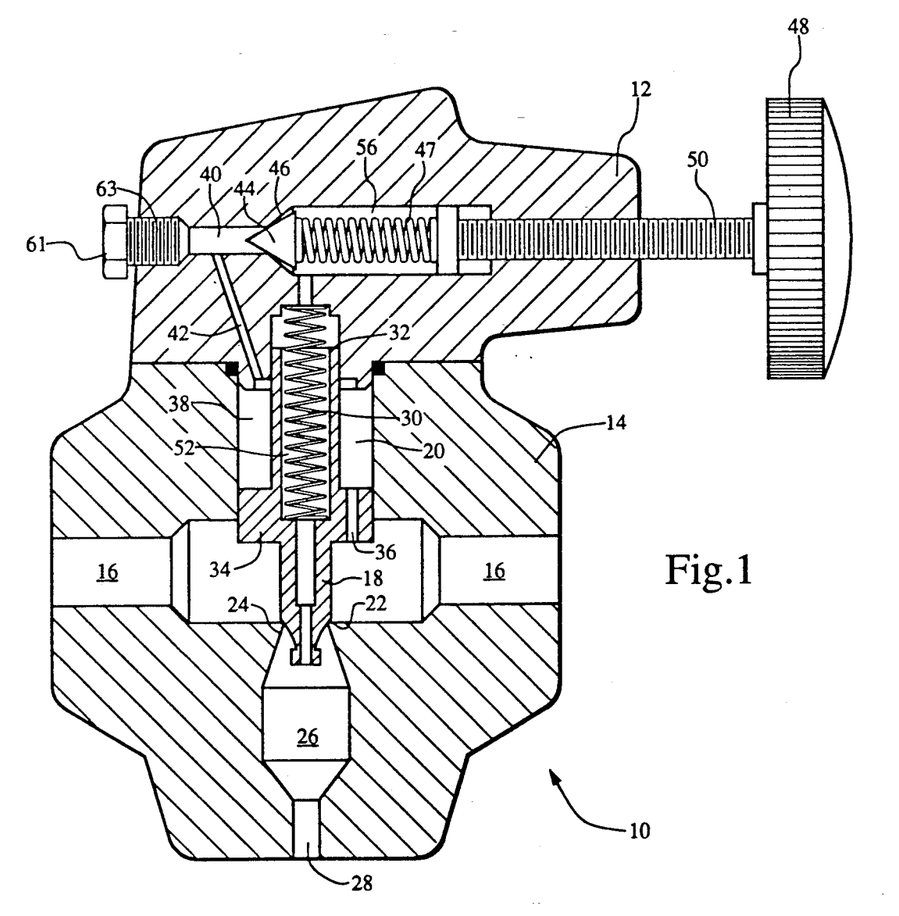
FIG. 1 is a cross-sectional side view of a conventional pilot operated, balanced piston relief valve shown in its closed position.
Figure 2:
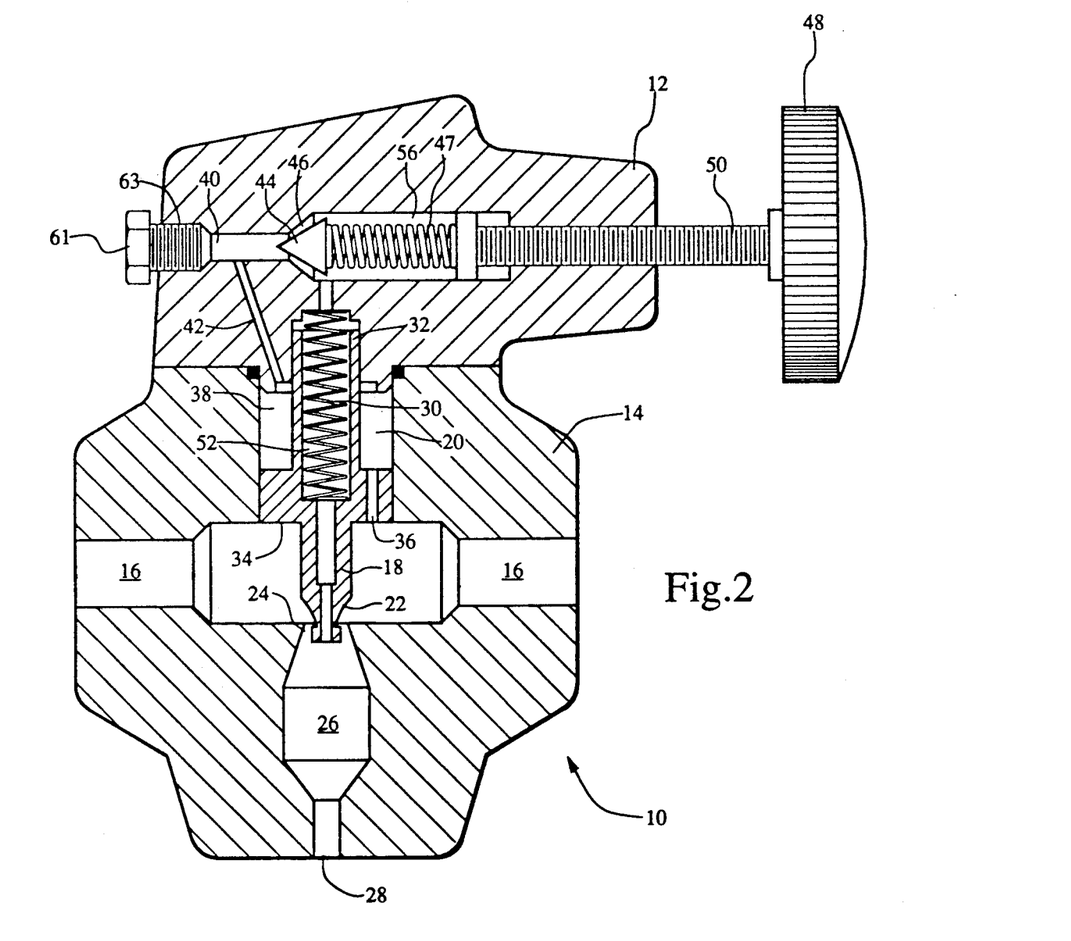
FIG. 2 is a cross-sectional side view of the conventional 5 relief valve of FIG. 1, shown in its open position.

FIGS. 1 and 2 illustrate a conventional pilot operated, balanced piston relief valve 10, the major components of which comprise pilot valve housing 12 and main valve 14. Relief valve 10 is typically employed as a safety measure in a pressurized hydraulic system, wherein internal passageway 16 within the body of main valve 14 is maintained in substantially constant fluid communication with pressurized oil or other fluid.

Balanced piston 18 is slidably disposed within cylinder 20 formed within valve 14. The lower end 22 of piston 18 is configured to form a seal within opening 24 which connects passageway 16 with chamber 26. Port 28 is typically connected to a fluid line leading to the tank or other fluid reservoir maintained at normal atmospheric pressure. Accordingly, chamber 26 is normally maintained at a lower pressure than the fluid within passageway 16, such that chamber 26 and port 28 function as a vent for discharging fluid to the tank, as described more fully below.

Compression spring 30 is operatively disposed within upper portion 32 of piston 18, biasing piston 18 in its downward position with lower end 22 being seated within opening 24. Shoulder 34 of piston 18 includes offset orifice 36 for providing fluid communication between passageway 16 and chamber 38 which, in turn, communicates with chamber 40 through orifice 42 formed within pilot valve 12.

The conventional pilot valve 12 comprises poppet 44 which operatively engages seat 46 to provide a seal between the high pressure side of valve 12, defined by chamber 40, and the low pressure side 56. Compression spring 47 maintains poppet 44 in a normally closed position, as shown in FIG. 1. Rotation of knob 48 moves screw 50 inwardly or outwardly within valve 12, thereby increasing or decreasing, respectively, the tension provided by spring 47 in maintaining a seal between poppet 44 and seat 46. Those skilled in the art will fully understand the operation of relief valve 10, as described briefly below.

When the fluid pressure within passageway 16 rises above a desired maximum point, the fluid, passing freely through orifice 36, chamber 38, orifice 42, and into chamber 40, provides sufficient pressure against poppet 44 to unseat poppet 44 from seat 46. With poppet 44 unseated, as shown in FIG. 2, fluid passes through seat 46 into low pressure area 56 and continues through central bore 52 of piston 18 into chamber 26, ultimately venting to the tank through port 28. This occurrence creates a pressure differential between passageway 16 and chamber 38, wherein the fluid pressure within passageway 16 is substantially greater than that within chamber 38, thereby forcing piston 18 upward against the relatively light resistance of spring 30. Upon the upward movement of piston 18, lower end 22 is unseated from opening 24, thereby allowing the fluid within passageway 16 to vent directly to the tank through port 28.

Figure 3:
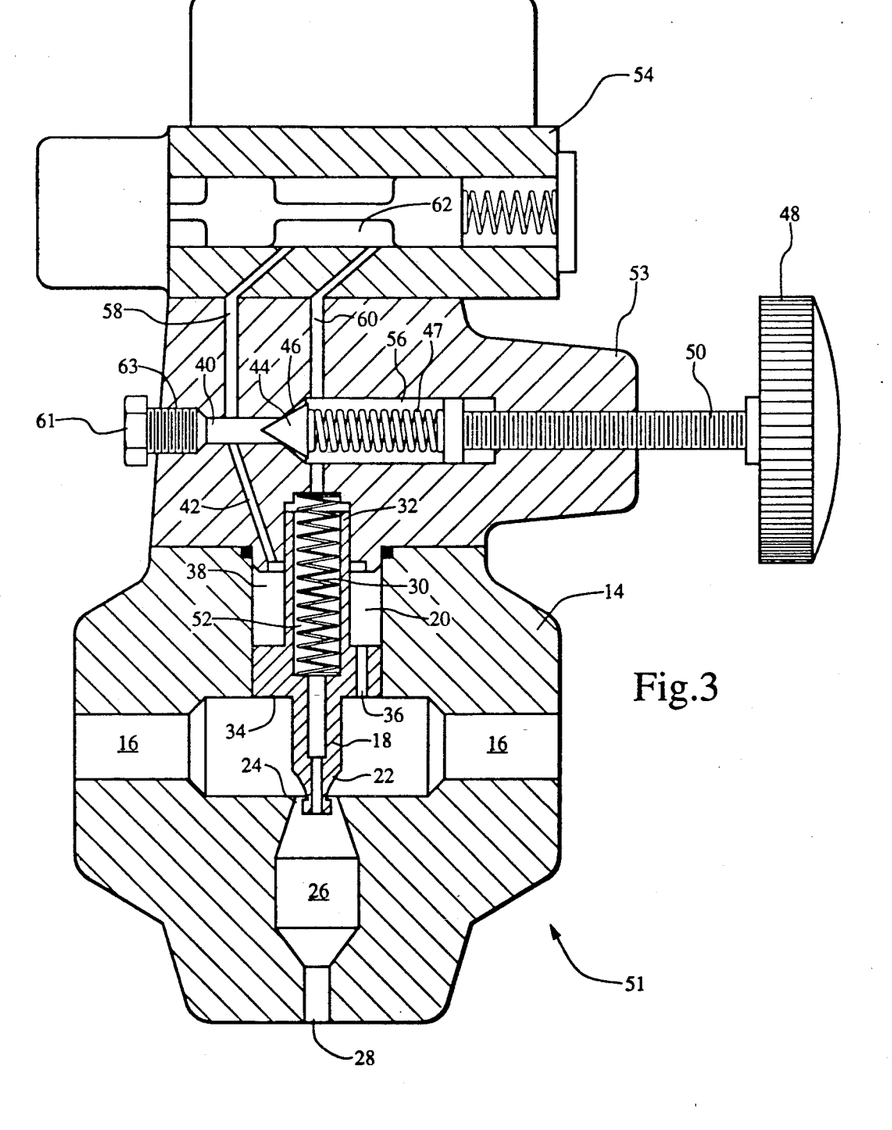
FIG. 3 is a cross-sectional side view of a conventional pilot operated, balanced piston relief valve incorporating a remotely actuatable solenoid valve.

Those skilled in the art will also appreciate the fact that it has been found highly desirable to provide means for remotely actuating a conventional pilot operated, balanced piston relief valve, so that the venting function can be utilized regardless of the system pressure Accordingly, as shown in FIG. 3, it is known that a modified pilot valve 53 can be fitted within a solenoid valve 54 and incorporated onto a conventional main valve 14. With solenoid valve 54 in its open position as illustrated, chamber 40 is maintained in fluid communication with low pressure side 56 of poppet 44 through additional orifices 58 and 60 formed in modified valve 53, orifices 58 and 60 communicating through chamber 62 within solenoid valve 54. It will be readily understood that solenoid valve 54 may be moved to a closed position, thereby preventing fluid communication between orifices 58 and 60 so that modified relief valve 51 performs substantially the same as conventional relief valve 10.

While modified relief valve 51 provides the advantage of remote actuation, the deficiencies in the design are readily apparent. Primarily, considerable modifications are required to convert a conventional pilot valve 12 to a modified pilot valve 53, adapted to accommodate a solenoid valve 54. Furthermore, the modifications may only be suitable for adapting the housing for use with one particular solenoid valve 54. In order to provide a variety of performance characteristics, it is necessary to maintain a supply of different solenoid valves and corresponding modified pilot valves, both of which are relatively large and expensive components which will consume a considerable amount of capital and inventory space.

It is also known in the art that plug 61 may be removed from pilot valve 12, with a supplementary fluid line (not shown) secured to port 63 providing means for employing an external vent with relief valve 10. A variety of conventional valves could be utilized as an external vent, such as an electrically actuatable solenoid adapted to open and close as required by the application. The solenoid or other valve could be utilized to selectively vent fluid from relief valve 10 only when actuated by the user, or could be actuated automatically based on the pressure at a remote location in the system. The use of a supplementary fluid line and valve means communicating with relief valve 10 through port 63 enhances the performance characteristics of relief valve 10, but requires additional components which are unnecessary with the present invention.

Figure 4:
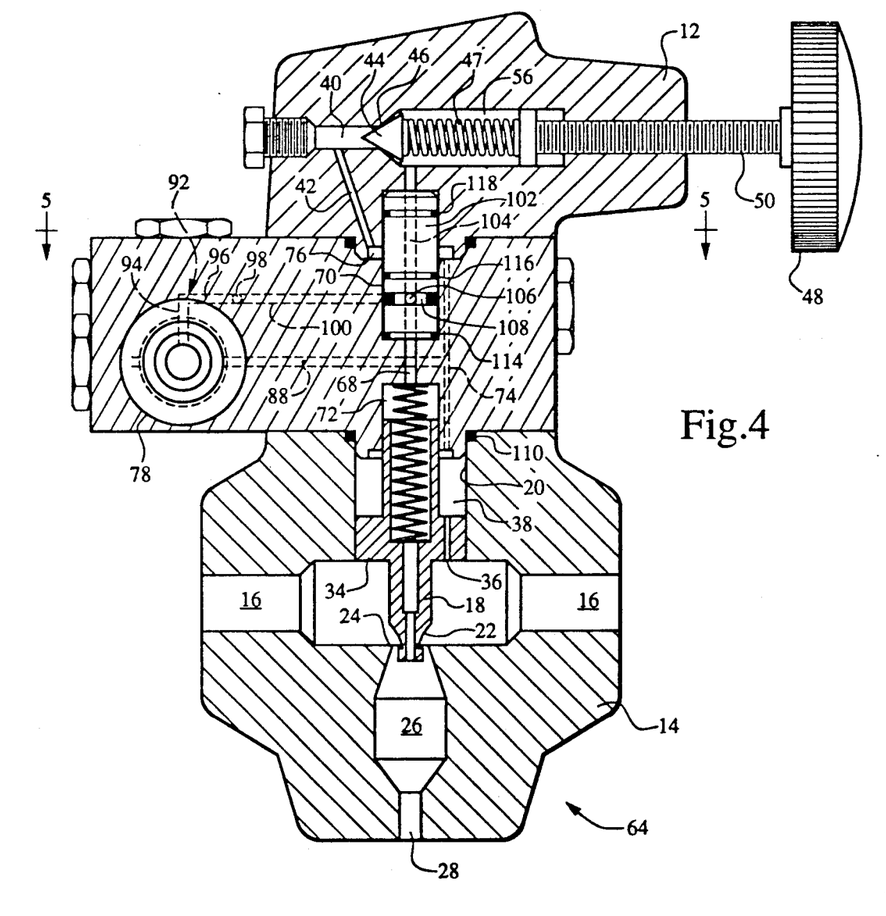
FIG. 4 is a cross-sectional side view of the preferred embodiment of the present invention.
Figure 5:
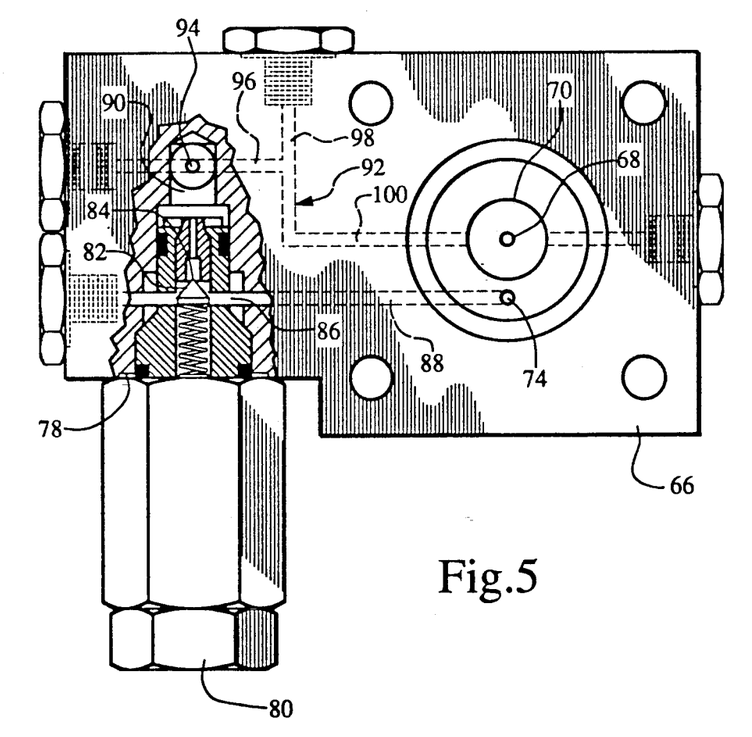
FIG. 5 is an enlarged sectional view of the preferred embodiment of this invention, taken along line 5—5 of FIG. 4.

The preferred embodiment of the present invention is illustrated in FIGS. 4 and 5, wherein modified relief valve 64 is shown comprising a pilot valve 12, a main valve 14, and modular manifold 66 operatively disposed therebetween. Manifold 66 has a vertical bore 68 formed therethrough providing communication between cylindrical openings 70 and 72. Vertical bore 74 is formed through manifold 66 to provide fluid communication between chambers and 76.

Manifold 66 has a receptacle 78 formed therein, specially adapted to receive a cartridge valve 80, which comprises a poppet 82 and corresponding seat 84. The upstream, or high pressure, side of cartridge valve 80 comprises chamber 86 which is maintained in fluid communication with vertical bore 74 by means of horizontal bore 88. The downstream, or low pressure, side of cartridge 80 comprises chamber 90, which communicates with cylindrical opening 70 through passageway 92, comprising bores 94, 96, 98, and 100.

Disposed within cylindrical opening 70 is spool 102, having longitudinal bore 104 and radial bore 106 formed therethrough. As shown in FIG. 4, spool 102 includes an annular groove 108 disposed in the vicinity of the intersection of bore 100 and cylindrical opening 70, with radial bore 106 providing fluid communication between annular groove 108 and longitudinal bore 104. Such alignment between bore 100, annular groove 108, and radial bore 106 establish fluid communication between chamber 90 and longitudinal bore 104 which, in turn, provides communication between low pressure side 56 of the pilot valve 12 and longitudinal bore 52 through piston 18.

Fluid leakage between pilot valve 12, manifold 66, and main valve 14 is prevented by the use of sealing means such as O-rings, as those skilled in the art will understand. The precise number, size, and configuration of the sealing means may be varied without departing from the scope of the present invention. With the preferred embodiment shown, the O-rings are identified by the numerals 110, 112, 114, 116, and 118.

The uniquely variable performance characteristics of modified relief valve 64 are primarily attributable to the ability of manifold 66 to operatively receive a wide variety of standard cartridge valves, and on the inherent capabilities of such cartridge valves as known to those skilled in the art. Careful selection of the coil incorporated in cartridge valve 80, for example, can adapt cartridge valve 80 for actuation in response to any number of desired inputs. Cartridge Valve 80 may be selectively actuated by the user and maintained indefinitely in either its opened or closed position, or may be triggered by suitable pressure-sensing devices in response to system pressure other than that required to open pilot valve 12.

With cartridge valve 80 in its open position as shown, the aforementioned fluid connections provided by manifold 66 allow venting of the fluid within passageway 66 regardless of the pressure. With cartridge valve 80 maintained in its closed position, modified relief valve 64 vents the fluid only when the fluid pressure exceeds that required to open pilot valve 12, as with unmodified relief valve 10 described in detail above.

Since cartridge valve 80 may be actuated by a variety of different inputs from virtually any remote location, modified relief valve 64 provides at least the same degree of flexibility as modified relief valve 51, but without necessitating the use of an expensive solenoid valve 54 or a modified pilot valve 53. Relief valve 64 can easily be adapted to vent fluid to the tank in response to a condition (pressure, temperature, etc.) in a remote part of the system by attaching suitable sensing means to cartridge valve 80, without requiring the use of any supplemental fluid lines. Alternatively, cartridge valve 80 can be triggered by suitable pressure sensing means disposed in the same general vicinity as relief valve 64, so that fluid is vented at a pressure lower than that required to open pilot valve 12. The user of unique relief valve 64 need only maintain a supply of relatively inexpensive cartridge valves and corresponding coils in order to provide a wide variety of different performance characteristics.

The foregoing detailed description is to be clearly understood as being given by way of illustration and example only, the spirit and scope of the present invention being limited solely by the appended claims.

What is claimed is:

1. A hydraulic relief valve for venting fluid from a pressurized system, said relief valve comprising:
    a body, having a flow passage therethrough in communication with said fluid in said system and a vent in communication with a fluid reservoir;
    a main valve disposed in said flow passage actuatable to discharge fluid through said vent;
    a pilot valve responsive to the pressure of fluid in said flow passage and operable upon exceeding a selected pressure to actuate said main valve, said relief valve including
    selective valve means, removably disposed between said body and said pilot valve, for selectively discharging fluid through said vent in response to an input,
    said relief valve being operative to vent fluid from said system at said selected pressure in the absence of said selective valve means, said pilot valve being securable directly to said body.

2. A hydraulic relief valve as described in claim 1, wherein:
    said pilot valve is disposed in a pilot section; and
    said selective valve means are disposed in a manifold removably secured to said body between said body and said pilot section.

3. A hydraulic relief valve as described in claim 2, wherein:
    said selective valve means comprise a cartridge valve.

4. A hydraulic relief valve as described in claim 1, wherein:
    said selective valve means operates in response to an electric signal.

5. A hydraulic relief valve as described in claim 1, wherein:
said selective valve means operates in response to the pressure in said system exceeding a second selected pressure.

6. A hydraulic relief valve for venting fluid from a pressurized system, said valve comprising:
a body, having a flow passage therethrough and a vent in fluid communication with a fluid reservoir;
a main valve disposed in said flow passage, movable between open and closed positions in response to pressure variations within said body, operable to provide communication between said flow passage and the reservoir through said vent when in said open position;
a pilot section having a pilot valve disposed therein, said pilot valve communicating with said flow passage and being automatically movable from a normally closed position to an open position at a selected pressure within said flow passage, wherein movement of said pilot valve to its open position provides communication between said flow passage and said reservoir through said vent, thereby causing a pressure variation within said body to effect the movement of said main valve to its open position; and
a manifold section, having an internal passageway formed therein and including selective valve means operatively disposed within said passageway, said manifold being removably secured to said body and said pilot section and disposed therebetween;
said selective valve means being selectively movable between open and closed positions in response to an input, said open position providing communication between said flow passage in said body and said vent through said passageway,
said relief valve being operative to vent fluid from said system at said selected pressure in the absence of said manifold section, said pilot section being securable to said body.

7. A hydraulic relief valve as described in claim 6, wherein:
said manifold section is disposed between said body and said pilot section.

8. A hydraulic relief valve as described in claim 6, wherein:
said selective valve means comprise a cartridge valve.

9. A hydraulic relief valve as described in claim 6, wherein:
said input comprises an electric signal.

10. A hydraulic relief valve as described in claim 6, wherein:
said input comprises a selected pressure within said system.

11. A hydraulic relief valve as described in claim 6, wherein:
said selective valve means are normally maintained in said open position, moving to said closed position in response to said input.

12. A hydraulic relief valve as described in claim 6, wherein:
said selective valve means are normally maintained in said closed position, moving to said open position in response to said input.

13. A hydraulic relief valve as described in claim 8, wherein:
said cartridge valve is actuated by a solenoid.

14. A selectively operable vent valve for use with a pilot operated hydraulic relief valve, said relief valve having a main valve operatively and removably securable to a pilot valve, said main valve being in constant communication with fluid within a system and said pilot valve being operable to discharge fluid from the main valve through a vent, said vent valve comprising:
a manifold, adapted for mounting between the pilot valve and the main valve of the relief valve, said manifold having internal passages formed therein comprising a first portion for providing fluid communication between the pilot valve and the main valve and a second portion for providing fluid communication between the main valve and the vent;
valve means movable between open and closed positions, operatively disposed within said second portion of said internal passage means, communication through said second portion of said internal passage means being established when said valve means is in said open position and interrupted when said valve means is in said closed position, said valve means being selectively movable between said open and closed positions in response to an input; wherein
movement of said valve means to said open position allows the substantially continuous discharge of fluid from said main valve through the vent, and movement of said valve means to said closed position allows the discharge of fluid through the vent only upon actuation of the pilot valve.

15. A selectively operable vent valve as set forth in claim 14, wherein said input comprises an electric signal.

16. A selectively operable vent valve as set forth in claim 14, wherein said input comprises a selected fluid pressure within the system.

17. A selectively operable vent valve as set forth in claim 14, wherein:
said manifold includes a receptacle formed therein; and
said valve means comprise a cartridge valve operatively disposed within said receptacle, said receptacle being adapted to receive said cartridge valve in a manner allowing said cartridge valve to control the flow of fluid through said second portion of said internal passage.

18. A manifold adapted for installation between the pilot valve section and the main valve section of a pilot operated hydraulic relief valve, said pilot valve section being directly securable to said main valve section to provide a fully functional relief valve, said manifold comprising:
a receptacle, adapted to receive selectively operable valve means; and
a series of internal passageways, comprising a first portion for establishing substantially constant fluid communication between the pilot valve section and the main valve section of the relief valve, and a second portion communicating through said receptacle for providing selective fluid communication between the pilot valve section and the main valve section of the relief valve in accordance with the operation of said selectively operable valve means.

19. A manifold as set forth in claim 18, further comprising sealing means for preventing fluid leakage from said manifold and said pilot valve section and said main valve section of said relief valve.

20. A manifold as set forth in claim 18, wherein said selectively operable valve means comprise a cartridge valve.

21. A manifold as set forth in claim 19, wherein said sealing means comprise a plurality of O-rings.

22. A manifold as set forth in claim 18, further comprising:
   a spool, having a longitudinal bore formed therethrough between first and second ends thereof, and a radial bore formed therethrough,
      said first end of said spool being adapted to fit within an opening in said manifold such that said longitudinal and radial bores are maintained in fluid communication with said second portion of said series of internal passageways,
      said second end of said spool being adapted to fit within an opening in said pilot valve section of said relief valve such that said longitudinal bore is maintained in fluid communication with said pilot valve section of said relief valve.

23. A manifold as set forth in claim 22, wherein said spool has an annular groove formed therein in the vicinity of said radial bore.

24. A manifold as set forth in claim 22, wherein:
   said spool is generally cylindrically shaped; and
   said sealing means comprise O-rings operatively disposed around said spool to prevent fluid leakage between said spool and said manifold and said pilot section of said relief valve.

* * * * *

UNITED STATES PATENT AND TRADEMARK OFFICE
CERTIFICATE OF CORRECTION

PATENT NO. : 5,131,427
DATED      : July 21, 1992
INVENTOR(S) : Steven T. Latza

It is certified that error appears in the above-identified patent and that said Letters Patent is hereby corrected as shown below:

Col. 3, line 35, after the word "conventional", please delete the number - 5-.

Col. 5, line 25, after the word "chambers", please add in bold the number - 38 -.

Signed and Sealed this

Twelfth Day of October, 1993

Attest:

BRUCE LEHMAN

Attesting Officer    Commissioner of Patents and Trademarks